United States Patent
Ku

(10) Patent No.: US 8,681,774 B2
(45) Date of Patent: Mar. 25, 2014

(54) SYSTEM AND METHOD OF ROUTING VOICE COMMUNICATIONS VIA PEERING NETWORKS

(71) Applicant: AT&T Intellectual Property I, L.P., Atlanta, GA (US)

(72) Inventor: Bernard Ku, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 13/855,374

(22) Filed: Apr. 2, 2013

(65) Prior Publication Data

US 2013/0223435 A1    Aug. 29, 2013

Related U.S. Application Data

(63) Continuation of application No. 11/954,142, filed on Dec. 11, 2007, now Pat. No. 8,411,665.

(51) Int. Cl.
*H04L 12/28* (2006.01)
*G01R 31/08* (2006.01)

(52) U.S. Cl.
USPC ........................................ 370/351; 370/238

(58) Field of Classification Search
USPC ........... 370/328, 351; 709/228, 240, 241, 242
See application file for complete search history.

(56) References Cited

U.S. PATENT DOCUMENTS

| | | | |
|---|---|---|---|
| 6,240,463 B1* | 5/2001 | Benmohamed et al. | 709/238 |
| 7,130,397 B2* | 10/2006 | Ferguson et al. | 379/112.04 |
| 7,395,351 B1* | 7/2008 | Nucci et al. | 709/242 |
| 7,856,509 B1* | 12/2010 | Kodeboyina | 709/238 |
| 7,974,295 B2 | 7/2011 | Tuohino et al. | |
| 8,224,994 B1* | 7/2012 | Schneider | 709/245 |
| 8,244,908 B2* | 8/2012 | Dempo | 709/238 |
| 2004/0098478 A1 | 5/2004 | Koetke et al. | |
| 2004/0193880 A1 | 9/2004 | Walmsley | |
| 2005/0033809 A1 | 2/2005 | McCarthy et al. | |
| 2005/0207402 A1 | 9/2005 | Kobayashi et al. | |
| 2006/0165059 A1 | 7/2006 | Batni et al. | |
| 2007/0061397 A1* | 3/2007 | Gregorat et al. | 709/203 |
| 2007/0116253 A1 | 5/2007 | Batni et al. | |
| 2007/0211872 A1 | 9/2007 | Cai et al. | |
| 2008/0137832 A1 | 6/2008 | Heinze et al. | |
| 2009/0201911 A1* | 8/2009 | DuPertuis et al. | 370/352 |

OTHER PUBLICATIONS

M. Mealling, Request for Commenting (RFC) 2915, Sep. 2000, Updates 2168, pp. 1-18.*
M. Mealling, Request for Commenting (RFC) 3403, Oct. 20002, Updates 2915 and 2168, pp. 1-14.*

* cited by examiner

*Primary Examiner* — Mark Rinehart
*Assistant Examiner* — Angel Brockman
(74) *Attorney, Agent, or Firm* — Akerman LLP; Michael K. Dixon; Roy P. Zachariah

(57) ABSTRACT

A method of routing voice communications is disclosed and includes receiving network event data at a telephone number mapping (ENUM) server of an originating network from a plurality of peering border elements associated with a plurality of peering communication networks. The network event data indicates a health status of each of the peering communication networks. The method also includes determining a network weight related to each of the peering communication networks based on the network event data, wherein each network weight indicates a proportion of calls that are to be routed from the originating network via the related peering communication network. The method further includes dynamically assigning a plurality of preference field values to session initiation protocol (SIP) addresses of the peering border elements within a plurality of naming authority pointer (NAPTR) records, based on the network weights.

20 Claims, 6 Drawing Sheets

SYSTEM AND METHOD OF ROUTING VOICE COMMUNICATIONS VIA PEERING NETWORKS

CROSS-REFERENCE TO RELATED APPLICATION

The present application is a continuation of and claims priority to U.S. patent application Ser. No. 11/954,142, filed on Dec. 11, 2007, now U.S. Pat. No. 8,411,665 which is hereby incorporated by reference in its entirety.

FIELD OF THE DISCLOSURE

The present disclosure generally relates to communication networks, and more particularly relates to routing voice communications via peering networks.

BACKGROUND

Internet Protocol (IP) multimedia carriers can provide voice communication services and other services via IP Multimedia Subsystem (IMS) networks. One IP multimedia carrier may have multiple IP peering relationships with other carriers, in order to connect calls between originating and terminating devices via different carrier networks. In the event of congestion or other problems in one or more peering carrier networks, a call may fail to reach its terminating device.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF THE DRAWINGS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily delimit any of the claimed systems, methods or computer-readable media. Moreover, some statements may apply to some disclosed features but not to others.

Figure 1:
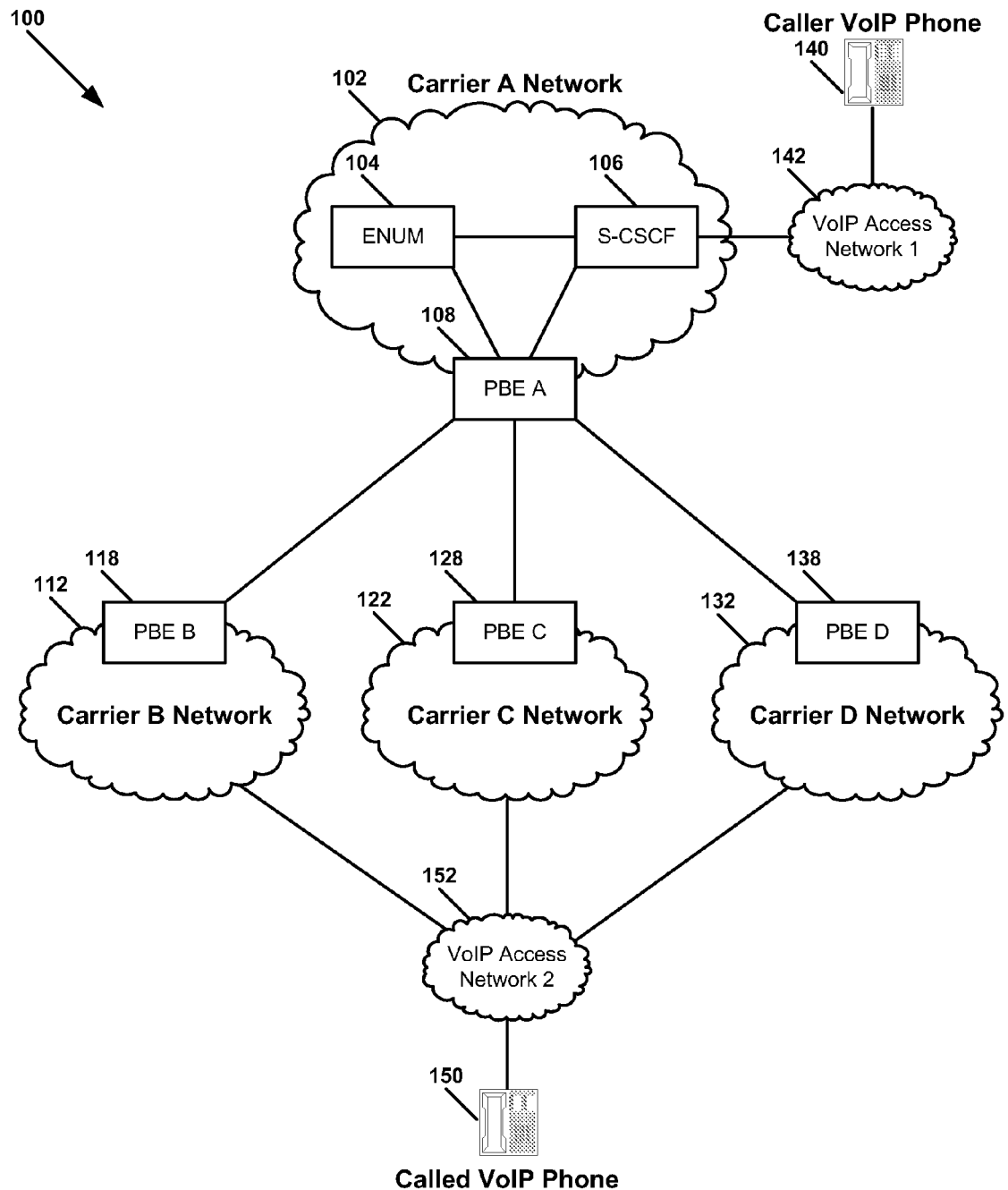
FIG. 1 is a block diagram illustrating a particular embodiment of a system to route voice communications via peering networks.

FIG. 1 illustrates a particular embodiment of a system 100 to route voice communications via peering networks. The system 100 includes a plurality of peering Voice-over Internet Protocol (VoIP) carrier networks. For example, the plurality of peering carrier networks include a Carrier A network 102 that communicates with a Carrier B network 112, a Carrier C network 122 and a Carrier D network 132. While four peering carrier networks are illustrated, the plurality of peering carrier networks can include fewer than or more than four networks. In addition, the Carrier A network 102 communicates with a first VoIP access network 142, while the Carrier B network 112, the Carrier C network 122 and the Carrier D network 132 each communicate with a second VoIP access network 152.

Each of the carrier networks includes at least one peering border element (PBE). For example, the Carrier A network 102 includes a first peering border element (PBE A) 108, the Carrier B network 112 includes a second peering border element (PBE B) 118, the Carrier C network 122 includes a third peering border element (PBE C) 128, and the Carrier D network 132 includes a fourth peering border element (PBE D) 138. In one embodiment, each carrier network includes elements of an IP Multimedia Subsystem (IMS). For instance, the Carrier A network 102 includes a telephone number mapping (ENUM) server 104 that stores naming authority pointer (NAPTR) records related to various subscriber devices, and a serving call session control function (S-CSCF) network element 106 that functions as a session initiation protocol (SIP) server to allow subscriber devices to register with the Carrier A network 102. Each carrier network can include at least one S-CSCF, at least one proxy CSCF (P-CSCF), at least one interrogating CSCF (I-CSCF), at least one home subscriber server (HSS), at least one application server, at least one ENUM server, or any combination thereof.

The S-CSCF 106 is adapted to receive a call connection request originating from the caller VoIP phone 140 via the first VoIP access network 142. The connection request includes an E.164 number associated with a destination device, such as the called VoIP phone 150. In an illustrative embodiment, the connection request can be received at the S-CSCF 106 via an originating P-CSCF (not shown) that serves as a first point of contact between the Carrier A network 102 and the caller VoIP phone 140. The S-CSCF 106 is adapted to translate the E.164 number to a fully qualified domain name (FQDN). For example, the S-CSCF 106 can translate the telephone number +1-512-222-5485 into the FQDN 5.8.4.5.2.2.2.2.1.5.1.e164.arpa.

Further, the terminating S-CSCF 106 is adapted to send a request to the ENUM server 104 for NAPTR records related to the FQDN. The S-CSCF 106 is adapted to receive a plurality of NAPTR records related to the called VoIP phone 150 from the ENUM server 104 in response to the request. The S-CSCF 106 is adapted to send a SIP INVITE communication to the called VoIP phone 150 via one of the switches PBE B 118, PBE C 128 or PBE D 138, based on information in the NAPTR records received from the ENUM server 104.

Figure 5:
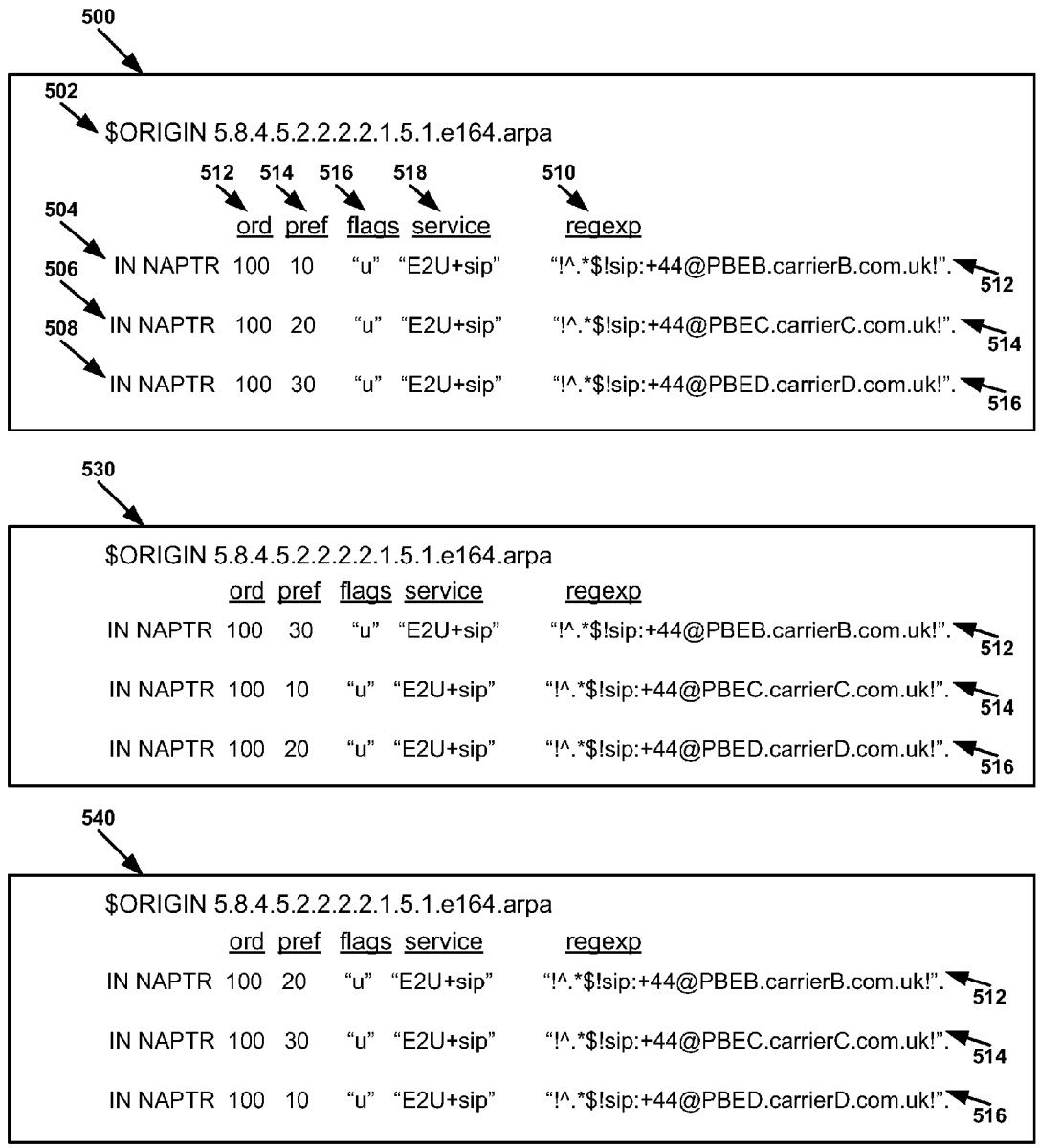
FIG. 5 is a block diagram illustrating examples of naming authority pointer (NAPTR) records.

The NAPTR records received from the ENUM server 104 include a plurality of NAPTR records related to the switches PBE B 118, PBE C 128 and PBE D 138. Each NAPTR record in this plurality includes a SIP address of one of the switches, as well as an order field value and a preference field value that can be used by the S-CSCF 106 to determine whether the switch is to be used to route the call from the caller VoIP phone 140 to the called VoIP phone 150. Examples of NAPTR records are illustrated in FIG. 5.

In an illustrative embodiment, the S-CSCF 106 is adapted to route a call to a SIP address of a PBE that is associated with the lowest combination of order field and preference field values. For instance, if order field and preference field values in a NAPTR record having a SIP address of PBE B 118 are [100,10], and order field and preference field values in NAPTR records having SIP addresses of PBE C 128 and PBE D 138 are [100,20] and [100,30], respectively, the combination of the order field value and preference field value associated with the SIP address of PBE B 118 is lower (110) than the combinations associated with SIP addresses of PBE C 128 and PBE D 138 (120 and 130, respectively). Hence, the S-CSCF 106 can be adapted to route a call bound for the called VoIP phone 150 via PBE B 118. In an alternative embodiment, a call can be routed to the SIP address of a PBE associated with a lowest combination of order field and preference field values, where the preference field values are constant and the order field values vary. In yet another embodiment, a call can be routed to the SIP address of a PBE associated with a lowest combination of order field and preference field values, the order field and preference field values may both vary.

The ENUM server 104 is adapted to periodically extract network event data from PBE B 118, PBE C 128, and PBE D 138. The network event data can relate to network congestion, the function of network elements, the function of software applications, other indicia of a network health status, or a combination thereof. Examples of network event data can include delays in call setup, dropped calls, packet loss, and other indicia. The ENUM server 104 is adapted to determine, based on the network event data, whether each of the Carrier B network 112, the Carrier C network 122, and the Carrier D network 132 is operating within pre-defined parameters. Such parameters can be received at the ENUM server 104 from a network administrator or other user.

The ENUM server 104 is adapted to determine weights associated with the Carrier B network 112, the Carrier C network 122, and the Carrier D network 132, based on the network event data. In one embodiment, the ENUM server 104 is adapted to determine network weights that reflect a proportion of calls that can be routed to each of the Carrier B network 112, the Carrier C network 122, and the Carrier D network 132, such that congestion or delay within each of Carrier B network 112, the Carrier C network 122, and the Carrier D network 132 is equal or approximately equal, given the presence or severity of any problems in the Carrier B network 112, the Carrier C network 122, the Carrier D network 132, or any combination thereof.

For instance, when the Carrier B network 112, the Carrier C network 122 and the Carrier D network 132 are operating within pre-defined parameters, the ENUM server 140 can determine equal or approximately equal network weights for Carrier B network 112, the Carrier C network 122 and the Carrier D network 132 (e.g., one-third each, or 0.333, 0.333 and 0.334). In another example, where the Carrier B network 112 is operating within pre-defined parameters, but the Carrier C network 122 and the Carrier D network 132 are not, the ENUM server 104 can determine different weights for the Carrier B network 112, the Carrier C network 122 and the Carrier D network 132 (e.g., 0.85, 0.10 and 0.05).

In addition, the ENUM server 104 is adapted to configure naming authority pointer (NAPTR) records that include session initiation protocol (SIP) addresses of PBE B 118, PBE C 128 and PBE D 138, based on the network weights. In one embodiment, the ENUM server 104 can dynamically assign order field values and preference field values within each of the NAPTR records, such that the S-CSCF 106 will route each call to a PBE associated with a least congested one of the Carrier B network 112, the Carrier C network 122, and the Carrier D network 132, while taking into account one or more communication networks that may not be operating within the pre-defined parameters. For instance, the ENUM server 104 can be adapted to dynamically assign a lowest combination of order field and preference field values to the least congested one of the Carrier B network 112, the Carrier C network 122, and the Carrier D network 132.

In a particular embodiment, the ENUM server 104 is adapted to receive a NAPTR record request from the S-CSCF 106. The NAPTR record request can include a FQDN or other indicator of a destination device, such as the called VoIP phone 150. The ENUM server 104 is adapted to retrieve NAPTR records related to the FQDN or other indicator identified by the NAPTR record request and to send the retrieved NAPTR records to the S-CSCF 106. The ENUM server 104 can then re-assign order field values, preference field values, or any combination thereof, in the NAPTR records based on the previously determined network weights, such that the S-CSCF 106 will route a next call via the least congested one of the Carrier B network 112, the Carrier C network 122, and the Carrier D network 132, taking into account the network used to route the call placed to the VoIP phone 150. The ENUM server 104 can continue dynamically assigning the order field values, preference field values, or any combination thereof, until new network weights are determined, until a new network event sample period ends, or a combination thereof.

In an illustrative embodiment, if the Carrier B network 112, the Carrier C network 122, and the Carrier D network 132 are operating within pre-defined parameters, the ENUM server 104 can be adapted to determine equal or approximately equal weights for each of the networks, such that calls will be distributed evenly among the Carrier B network 112, the Carrier C network 122, and the Carrier D network 132, in a round-robin fashion. The ENUM server 104 can dynamically assign order field values, preference field values, or any combination thereof, in the NAPTR records, such that calls are routed evenly from the Carrier A network 102 via PBE B 118, PBE C 128 and PBE D 138. For instance, the ENUM server 104 can dynamically assign a lowest combination of order field and preference field values to a NAPTR record including a SIP address of PBE B 118 for one-third of calls; to a NAPTR record including a SIP address of PBE C 128 for another one-third of calls; and to a NAPTR record including a SIP address of PBE D 138 for an additional one-third of calls.

Accordingly, the ENUM server 104 can be adapted to send NAPTR records having a lowest combination of order field and preference field values associated with a SIP address of PBE B 118 to the S-CSCF 106 in response to one-third of NAPTR record requests; to send NAPTR records having a lowest combination of order field and preference field values associated with a SIP address of PBE C 128 to the S-CSCF 106 in response to one-third of NAPTR record requests; and to send NAPTR records having a lowest combination of order field and preference field values associated with a SIP address of PBE D 138 to the S-CSCF 106 in response to one-third of NAPTR record requests.

In another example, the Carrier B network 112 can be operating within pre-defined parameters; the Carrier C network 122 can be experiencing a certain degree of congestion; and the Carrier D network 132 can be experiencing a greater degree of congestion. The ENUM server can determine that, due to the congestion in the Carrier C network 122 and the Carrier D network 132, routing eighty-five percent of calls via the Carrier B network 112, routing ten percent of calls via the Carrier C network 122, and routing five percent of calls via the Carrier D network 132, will result in similar or equal congestion or delay among the Carrier B network 112, the Carrier C network 122, and the Carrier D network 132 for calls routed by the S-CSCF 106.

The ENUM server 104 can be adapted to determine different weights for each of the networks, such that eighty-five percent of calls will be routed via the Carrier B network 112; ten percent of calls will be routed via the Carrier C network 122; and five percent of calls will be routed via the Carrier D network 132. The ENUM server 104 can dynamically assign order field values, preference field values, or any combination thereof, in the NAPTR records to match the network weights. For instance, the ENUM server 104 can dynamically assign a lowest combination of order field and preference field values to a NAPTR record including a SIP address of PBE B 118 for eighty-five percent of calls; to a NAPTR record including a SIP address of PBE C 128 for ten percent of calls; and to a NAPTR record including a SIP address of PBE D 138 for five percent of calls.

Accordingly, the ENUM server 104 can be adapted to send NAPTR records having a lowest combination of order field and preference field values associated with a SIP address of PBE B 118 to the S-CSCF 106 in response to eighty-five percent of NAPTR record requests; to send NAPTR records having a lowest combination of order field and preference field values associated with a SIP address of PBE C 128 to the S-CSCF 106 in response to ten percent of NAPTR record requests; and to send NAPTR records having a lowest combination of order field and preference field values associated with a SIP address of PBE D 138 to the S-CSCF 106 in response to five percent of NAPTR record requests.

Figure 2:
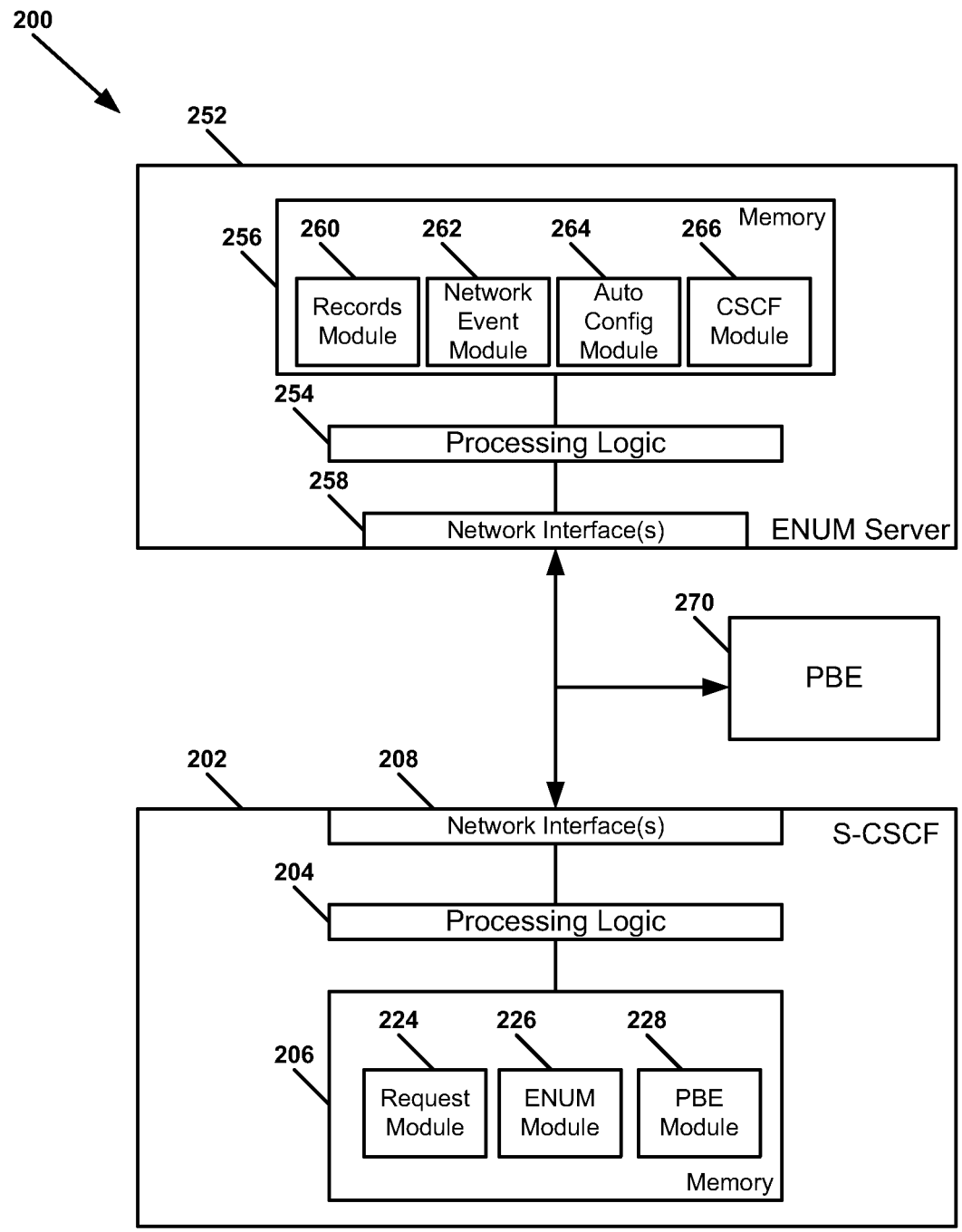
FIG. 2 is a block diagram illustrating a second particular embodiment of a system to route voice communications via peering networks.

FIG. 2 illustrates a second particular embodiment of a system 200 to route voice communications via peering networks. The system 200 includes a serving call session control function (S-CSCF) network element 202 coupled to a telephone number mapping (ENUM) server 252. The S-CSCF 202 and the ENUM server 252 also communicate with a switch, such as a peering border element (PBE) 270. The S-CSCF 202, the ENUM server 252 and the PBE 270 are associated with a first carrier communication network, and the PBE 270 is adapted to communicate with PBEs of a plurality of communication networks peering with the first carrier communication network.

The S-CSCF 202 includes processing logic 204 and memory 206 accessible to the processing logic 204. The processing logic 204 can be coupled to one or more network interfaces 208 that are adapted to facilitate communication between the S-CSCF 202 and the ENUM server 252, and to facilitate communication between the S-CSCF 202 and the PBE 270. The memory 206 includes a plurality of modules 224, 226 and 228 that are adapted to enable the S-CSCF 202 to provide a plurality of functions with respect to routing voice communications via peering networks. In one embodiment, the modules 224, 226 and 228 include instructions that are readable and executable by the processing logic 204, such as aspects of one or more software applications, operating systems or other computer programs In other embodiments, the modules 224, 226 and 228 can include software instructions, hardware logic, or a combination thereof.

The memory 206 includes a request module 224 that is executable by the processing logic 204 to receive a call connection request from an originating device, such as a caller VoIP phone. The connection request includes an E.164 number associated with a destination device, such as a called party VoIP phone communicating with one of the peering communication networks. The request module 224 is executable by the processing logic 204 to translate the E.164 number to a fully qualified domain name (FQDN). The memory 206 also includes an ENUM module 226 that is executable by the processing logic 204 to send a NAPTR record request including the FQDN associated with the E.164 number of the destination device to the ENUM server 252. The ENUM module 226 is executable by the processing logic 204 to receive the requested NAPTR records from the ENUM server 252.

In addition, the memory 206 includes a PBE module 228 that is executable by the processing logic 204 to select one of a plurality of switches communicating with the destination device, such as one of a plurality of peering border elements (PBEs) communicating with the PBE 270, based on the NAPTR records received from the ENUM server 252. The PBE module 228 is executable by the processing logic 204 to select a switch based on a value included in a preference field of each NAPTR record that includes a SIP address of one of the PBEs communicating with the PBE 270. The PBE module 228 can be executable by the processing logic 204 to route the call associated with the connection request via the selected PBE.

The ENUM server 252 includes processing logic 254 and memory 256 accessible to the processing logic 254. The processing logic 254 can be coupled to one or more network interfaces 258 that are adapted to facilitate communication between the ENUM server 252 and the S-CSCF 202, and to facilitate communication between the ENUM server 252 and the PBE 270. The memory 256 includes a plurality of modules 260-266 that are adapted to enable the ENUM server 252 to provide a plurality of functions with respect to routing voice communications via peering networks. In one embodiment, the modules 260-266 include instructions that are readable and executable by the processing logic 254, such as aspects of one or more software applications, operating systems or other computer programs In other embodiments, the modules 260-266 can include software instructions, hardware logic, or a combination thereof.

The memory 256 includes a records module 260 to store a plurality of naming authority pointer (NAPTR) records. Examples of NAPTR records are illustrated in FIG. 5. In a particular embodiment, each of the NAPTR records is associated with a fully qualified domain name (FQDN) related to a subscriber device. A plurality of the NAPTR records associated with a FQDN of a subscriber device can each include a SIP address associated with one of a plurality of PBEs communicating with the PBE 270 and with the subscriber device. In addition, each such NAPTR record includes an order field value and a preference field value that can be used by the S-CSCF 202 to determine which of the plurality of PBEs communicating with the PBE 270 is to be used to route calls from originating devices communicating with the S-CSCF 202 to destination devices communicating with peering communication networks that include the PBEs communicating with the PBE 270.

The memory 256 also includes a network event module 262 that is executable by the processing logic 254 to periodically extract network event data from the plurality of PBEs communicating with the PBE 270. The network event data can relate to indicia of network health status related to the peering communication networks that include the plurality of PBEs. The network event module 262 is executable by the processing logic 254 to determine, based on the network event data, whether each of the peering communication networks is operating within pre-defined parameters. A network administrator or other user may configure such parameters.

The memory 256 includes an automatic configuration (Auto Config) module 264 that is executable by the processing logic 254 to determine weights associated with the peering communication networks, based on the network event data. For example, one or more of the peering communication networks may not be operating within pre-defined parameters due to network congestion, hardware or software malfunction, or a combination thereof. The Auto Config module 264 is executable by the processing logic 254 to determine network weights that reflect intended routing of calls among the peering communication networks, given a presence and severity of one or more problems in the peering communication networks.

In addition, the Auto Config module 264 is executable by the processing logic 254 to configure naming authority pointer (NAPTR) records that include session initiation protocol (SIP) addresses of the PBEs of the peering communication networks, based on the network weights. The Auto Config module 264 can be executable by the processing logic 254 to alter an order field value, a preference field value, or a combination thereof, within each of the NAPTR records, such that calls will be routed to a PBE associated with a least congested one of the peering communication networks, while taking into account one or more communication networks that may not be operating within the pre-defined parameters.

The memory 256 includes a CSCF module 266 that is executable by the processing logic 254 to receive a NAPTR record request from the S-CSCF 202. The NAPTR record request can include a FQDN or other indicator of a destination device associated with a first call. The CSCF module 266 is executable by the processing logic 254 to retrieve NAPTR records related to the FQDN or other indicator identified by the NAPTR record request and to send the retrieved NAPTR records to the S-CSCF 202. The Auto Config module 264 can be executable by the processing logic 254 to re-configure the NAPTR records based on the previously determined network weights, such that the S-CSCF 202 will route a next call via a least congested one of the peering communication networks, taking into account the network used to route the call placed to the destination device associated with the first call.

For example, when the peering communication networks are operating within pre-defined parameters, the Auto Config module 264 can be executable by the processing logic 254 to determine equal weights for each of the peering communication networks, such that calls will be distributed evenly among the peering communication networks, in a round-robin fashion. Further, the Auto Config module 264 can be executable by the processing logic 254 to dynamically assign order field values, preference field values, or any combination thereof, in NAPTR records that include SIP addresses of the peering border elements included in the peering communication networks, such that the S-CSCF 202 routes calls evenly via the peering border elements. In one embodiment, the Auto Config module 264 can be executable by the processing logic 254 to dynamically assign a lowest combination of order field and preference field values to a NAPTR record including a SIP address of a first PBE communicating with the PBE 270 for one-third of calls; to a NAPTR record including a SIP address of a second PBE communicating with the PBE 270 for one-third of calls; and to a NAPTR record including a SIP address of a third PBE communicating with the PBE 270 for an additional one-third of calls.

Accordingly, the CSCF module 266 can be executable by the processing logic 254 to send NAPTR records having a lowest combination of order field and preference field values associated with a SIP address of the first PBE communicating with the PBE 270 to the S-CSCF 202 in response to one-third of NAPTR record requests; to send NAPTR records having a lowest combination of order field and preference field values associated with a SIP address of the second PBE communicating with the PBE 270 to the S-CSCF 202 in response to one-third of NAPTR record requests; and to send NAPTR records having a lowest combination of order field and preference field values associated with a SIP address of the third PBE communicating with the PBE 270 to the S-CSCF 202 in response to one-third of NAPTR record requests.

In another example, a first one of the peering communication networks can be operating within pre-defined parameters; a second one of the peering communication networks can be experiencing a certain degree of congestion; and a third one of the peering communication networks can be experiencing a greater degree of congestion. The Auto Config module 264 can be executable by the processing logic 254 to determine that, due to the congestion in the second and third peering communication networks, seventy-five percent of calls are to be routed via the first peering communication network, seventeen percent of calls via the second peering communication network, and eight percent of calls via the third peering communication network.

The Auto Config module 264 can be executable by the processing logic 254 to determine different weights for each of the networks, such as a weight of 0.75 for the first peering communication network; 0.17 for the second peering communication network; and 0.08 for the third peering communication network. Further, the Auto Config module 264 can be executable by the processing logic 254 to dynamically assign order field values, preference field values, or any combination thereof, in the NAPTR records, such that the S-CSCF 202 routes calls via the peering border elements according to the network weights. For instance, the Auto Config module 264 can be executable by the processing logic 254 to dynamically assign a lowest combination of order field and preference field values to a NAPTR record including a SIP address of a first PBE communicating with the PBE 270 for seventy-five percent of calls; to a NAPTR record including a SIP address of a second PBE communicating with the PBE 270 for seventeen percent of calls; and to a NAPTR record including a SIP address of a third PBE communicating with the PBE 270 for eight percent of calls.

Accordingly, the CSCF module 266 can be executable by the processing logic 254 to send NAPTR records having a lowest combination of order field and preference field values associated with a SIP address of the first PBE communicating with the PBE 270 to the S-CSCF 202 in response to seventy-five percent of NAPTR record requests; to send NAPTR records having a lowest combination of order field and preference field values associated with a SIP address of the second PBE communicating with the PBE 270 to the S-CSCF 202 in response to seventeen percent of NAPTR record requests; and to send NAPTR records having a lowest combination of order field and preference field values associated with a SIP address of the third PBE communicating with the PBE 270 to the S-CSCF 202 in response to eight percent of NAPTR record requests.

Figure 3:
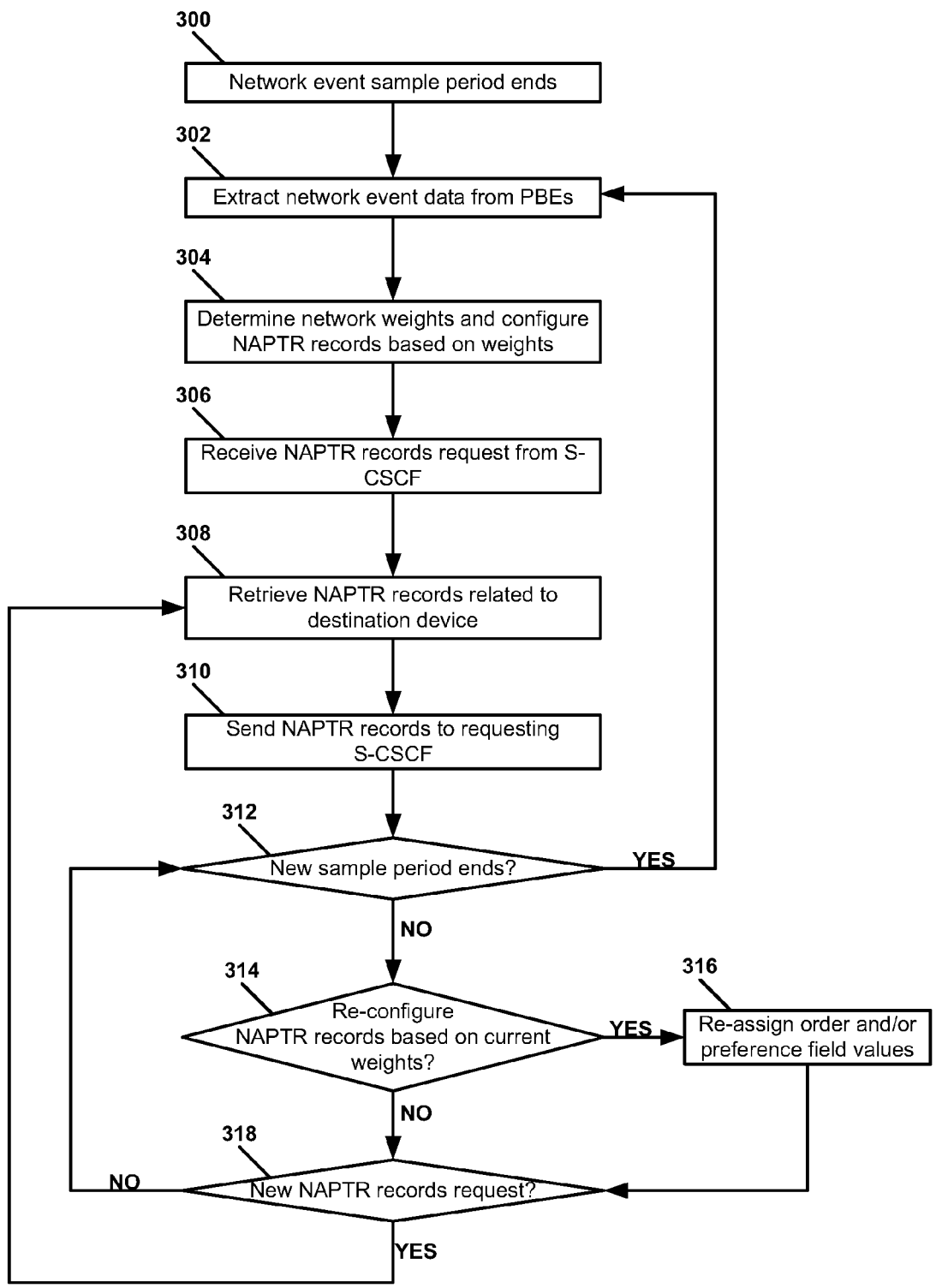
FIG. 3 is a flow diagram illustrating a particular embodiment of a method of routing voice communications via peering networks.

FIG. 3 illustrates a particular embodiment of a method of routing voice communications via peering networks. At block 300, a telephone number mapping (ENUM) server associated with an originating communication network detects that a network event sampling period has ended. Moving to block 302, the ENUM server extracts network event data from a plurality of peering border elements (PBEs), where each of the PBEs is associated with a communication network that peers with the originating communication network.

Proceeding to block 304, the ENUM server determines weights to be applied to each of the other communication networks based on the network event data. Further, the ENUM server configures a plurality of naming authority pointer (NAPTR) records that include session initiation protocol (SIP) addresses of the PBEs, based on the network weights. Continuing to block 306, the ENUM server receives a NAPTR record request from a serving call session control function (S-CSCF) network element associated with the originating communication network. Advancing to block 308, the ENUM server retrieves NAPTR records related to an indicator of a destination device identified by the NAPTR record request. At block 310, the ENUM server sends the retrieved NAPTR records to the requesting S-CSCF.

Moving to decision node 312, the ENUM server determines whether a new network event sampling period has ended. If a new network event sampling period has ended, the method returns to block 302. Conversely, if the ENUM server determines that a new network event sampling period has not ended, the method proceeds to decision node 314, and the ENUM server determines whether it is to re-configure the NAPTR records based on the previously determined network weights. For example, a lowest combination of order field and preference field values in a plurality of NAPTR records associated with a destination device may be associated with a peering border element of a first peering communication network. If network weights are equal, such that calls are to be routed evenly, or if the ENUM server otherwise determines that a next call should be routed via another peering communication network, the ENUM server may determine that it is to re-assign order field values, preference field values, or any combination thereof, such that the lowest combination of order field and preference field values is associated with a peering border element of another peering communication network before responding to a next NAPTR record request.

If the ENUM server determines that it is to re-configure the NAPTR records, the method proceeds to block 316, and the ENUM server re-assigns preference field values associated with the NAPTR records based on the previously determined network weights. Continuing to decision node 318, the ENUM server determines whether it has received a new NAPTR record request. If the ENUM server has not received a new NAPTR record request, the method returns to decision node 312. Whereas, if the ENUM server has received a new NAPTR record request, the method returns to block 308, and the ENUM server retrieves the most recently configured NAPTR records related to the destination device identified in the new NAPTR record request.

Figure 4:
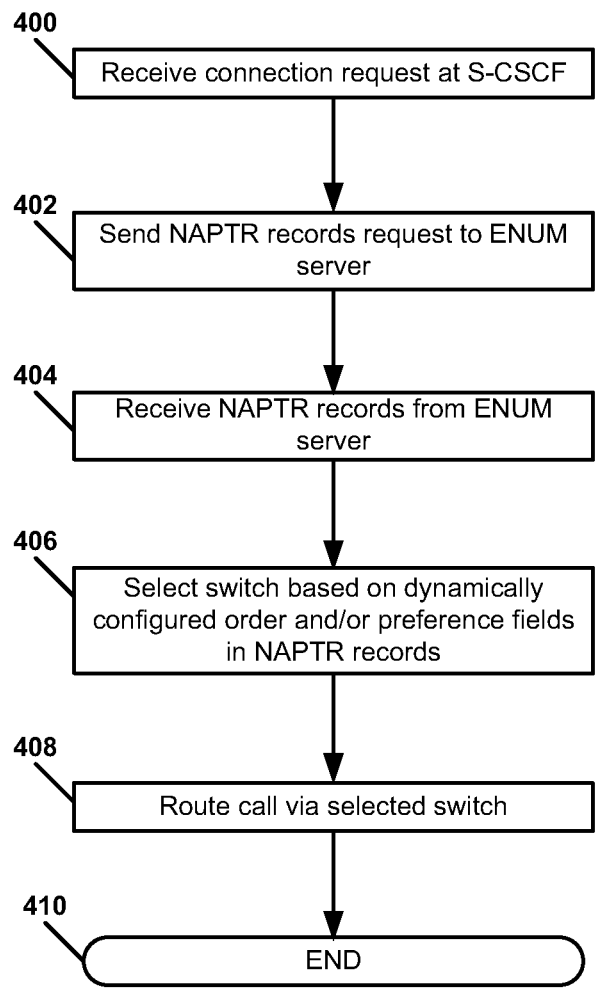
FIG. 4 is a flow diagram illustrating a second particular embodiment of a method of routing voice communications via peering networks.

FIG. 4 illustrates a second particular embodiment of a method of routing voice communications via peering networks. At block 400, a serving call session control function (S-CSCF) network element associated with an originating communications network receives a connection request from a caller device. In an illustrative embodiment, the S-CSCF can receive the connection request from the caller device via a proxy CSCF (P-CSCF) associated with the originating communications network. The connection request can be a session initiation protocol (SIP) INVITE communication or other connection request that identifies a destination device and requests a call setup between the caller device and the destination device.

Moving to block 402, the S-CSCF sends a request for NAPTR records associated with the destination device to a telephone number mapping (ENUM) server associated with the originating communications network. In an illustrative embodiment, the S-CSCF can translate an E.164 number of the destination device, which can be received with the connection request, to a fully qualified domain name (FQDN) of the destination device and can request NAPTR records associated with the FQDN from the ENUM server. Proceeding to block 404, the S-CSCF receives the requested NAPTR records from the ENUM server.

Continuing to block 406, the S-CSCF selects a switch, such as a peering border element (PBE), associated with one of a plurality of terminating communications networks that communicate with the destination device. The S-CSCF selects the switch associated with a lowest combination of order field and preference field values in the NAPTR records, where the order field values, preference field values, or any combination thereof, are dynamically configured by the ENUM server based on network weights. Advancing to block 408, the S-CSCF routes the call via the selected switch. For instance, the S-CSCF can send a SIP INVITE communication to the destination device via a second S-CSCF associated with one of the plurality of terminating networks. The method terminates at 410.

FIG. 5 illustrates examples of naming authority pointer (NAPTR) records. A telephone number mapping (ENUM) server can return such NAPTR records in response to a NAPTR record request received from a serving call session control function (S-CSCF) server or similar network element of an IP multimedia subsystem (IMS). Each NAPTR record can relate to a fully qualified domain name (FQDN) 502 of a destination device. Further, each NAPTR record includes a uniform resource indicator (URI) 510 associated with a service 518.

For example, a first NAPTR record 504 includes a session initiation protocol (SIP) URI 512 associated with a SIP service designated as "E2U+sip." The SIP URI 518 is an address of a switch, such as a peering border element associated with a Carrier B network (PBE B). A second NAPTR record 506 can include a second SIP URI 514 of a switch, such as a peering border element associated with a Carrier C network (PBE C). A third NAPTR record 508 can include a third SIP URI 516 of a switch, such as a peering border element associated with a Carrier D network (PBE D).

In addition, each NAPTR record includes an order field 512 and a preference field 514. The order field 512 defines an order in which the NAPTR records are to be selected for a particular service. The preference field 514 indicates a sequence in which NAPTR records are to be applied to a call in the course of providing each service. For instance, in the first set of NAPTR records 500, the SIP URI 512 is associated with order field and preference field values of [100,10], whereas the SIP URIs 514 and 516 are associated with order field and preference field values of [100,20] and [100,30], respectively. An S-CSCF can route a call via PBE B based on its lowest combination of order field and preference field values. In the second set of NAPTR records 530, the SIP URI 514 is associated with a preference field value of 10, whereas the SIP URIs 516 and 512 are associated with preference field values of 20 and 30, respectively. An S-CSCF can route a call via PBE C based on its lowest combination of order field and preference field values. Further, in the third set of NAPTR records 540, the SIP URI 516 is associated with a preference field value of 10, whereas the SIP URIs 512 and 514 are associated with preference field values of 20 and 30, respectively. The S-CSCF can route a call via PBE D based on its lowest combination of order field and preference field values.

The ENUM server dynamically assigns order field values, preference field values, or any combination thereof, in the NAPTR records to match weights associated with peering communication networks. For example, if the ENUM server is adapted to assign the order field and preference field values according to the first set of NAPTR records 500 for one-third of calls routed by the S-CSCF; to assign the preference field values according to the second set of NAPTR records 530 for one-third of calls routed by the S-CSCF; and to assign the preference field values according to the third set of NAPTR records 540 for one-third of calls routed by the S-CSCF. Accordingly, the ENUM server can return the first set of NAPTR records 500 for one-third of NAPTR record requests received from the S-CSCF; the second set of NAPTR records 530 for one-third of NAPTR record requests received from the S-CSCF; and the third set of NAPTR records 540 for one-third of the NAPTR record requests received from the S-CSCF.

In another example, the Carrier B communication network can be operating within pre-defined parameters; the Carrier C communication network is experiencing a certain degree of congestion; and the Carrier D communication network is experiencing a greater degree of congestion. The ENUM server can determine that, due to the congestion in the Carrier C and Carrier D communication networks, routing eighty-five percent of calls via the Carrier B communication network, routing ten percent of calls via the Carrier C communication network, and routing five percent of calls via the Carrier D communication network, will result in similar or equal congestion or delay among the Carrier B communication network, the Carrier C communication network, and the Carrier D communication network for calls routed by the S-CSCF.

The ENUM server is adapted to dynamically assign order field and preference field values according to the first set of NAPTR records 500 for eighty-five percent of calls routed by the S-CSCF; to assign order field and preference field values according to the second set of NAPTR records 530 for ten percent of calls routed by the S-CSCF; and to assign order field and preference field values according to the third set of NAPTR records 540 for five percent of calls routed by the S-CSCF. Accordingly, the ENUM server can return the first set of NAPTR records 500 for eighty-five percent of NAPTR record requests received from the S-CSCF; the second set of NAPTR records 530 for ten percent of NAPTR record requests received from the S-CSCF; and the third set of NAPTR records 540 for five percent of the NAPTR record requests received from the S-CSCF.

Figure 6:
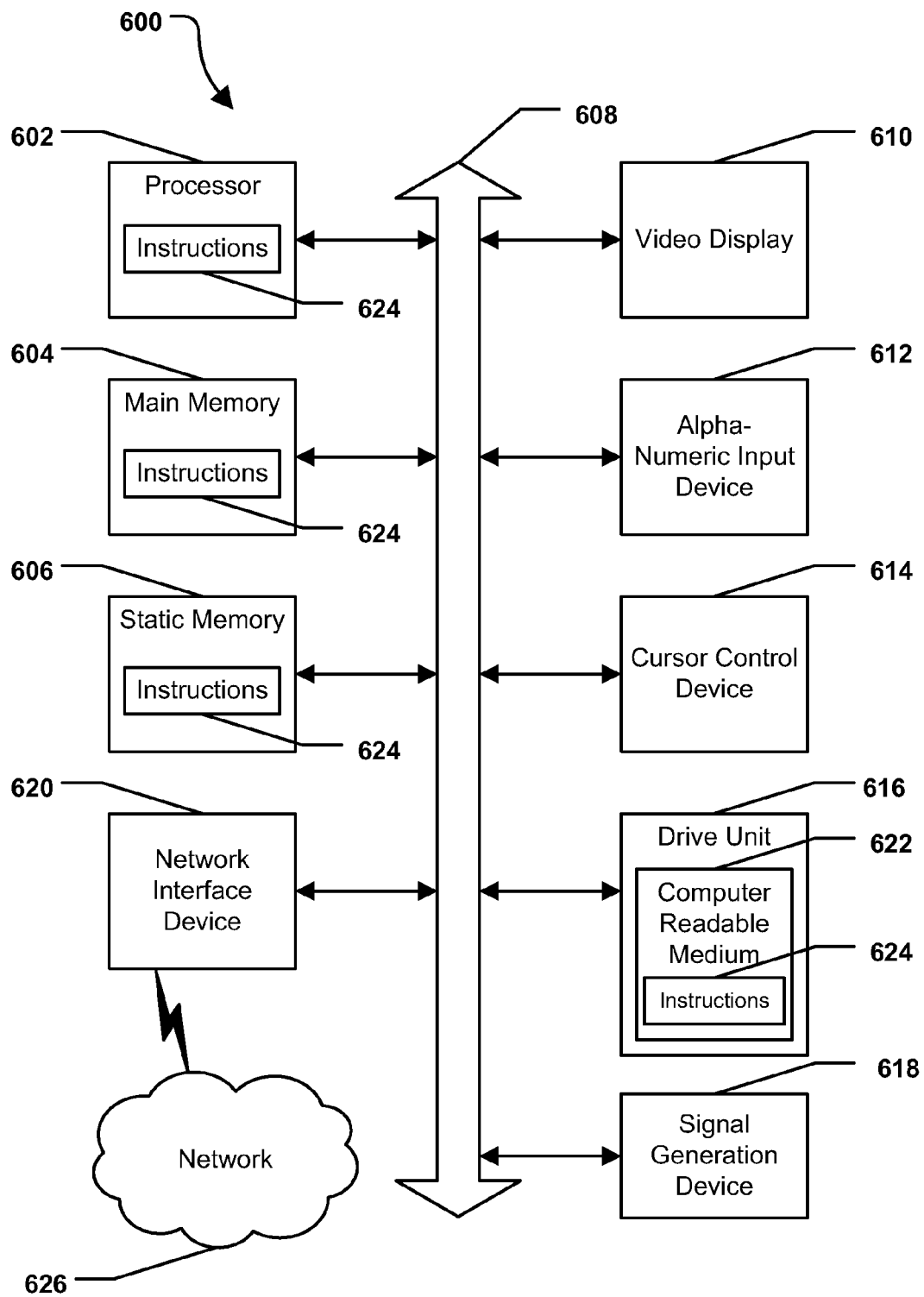
FIG. 6 is a block diagram illustrating a particular embodiment of a general computer system.

FIG. 6 shows an illustrative embodiment of a general computer system 600 including a set of instructions that can be executed to cause the computer system to perform any one or more of the methods or computer based functions disclosed herein. The computer system 600 may operate as a standalone device or may be connected, e.g., using a network, to other computer systems or peripheral devices. In an illustrative embodiment, such standalone and peripheral devices can include, for example, session initiation protocol (SIP) servers, telephone number mapping (ENUM) servers, caller devices, destination devices, peering border elements (PBEs), other network elements associated with one or more IP multimedia subsystems (IMSs) or other carrier networks, or any combination thereof, as illustrated in FIGS. 1-2.

In a networked deployment, the computer system may operate in the capacity of a server or as a client user computer in a server-client user network environment, or as a peer computer system in a peer-to-peer (or distributed) network environment. The computer system 600 can also be implemented as or incorporated into various devices, such as a personal computer (PC), a tablet PC, a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 600 can be implemented using electronic devices that provide voice, video or data communication. Further, while a single computer system 600 is illustrated, the term "system" shall also be taken to include any collection of systems or sub-systems that individually or jointly execute a set, or multiple sets, of instructions to perform one or more computer functions.

The computer system 600 may include a processor 602, e.g., a central processing unit (CPU), a graphics processing unit (GPU), or both. Moreover, the computer system 600 can include a main memory 604 and a static memory 606 that can communicate with each other via a bus 608. As shown, the computer system 600 may further include a video display unit 610, such as a liquid crystal display (LCD), an organic light emitting diode (OLED), a flat panel display, a solid state display, or a cathode ray tube (CRT). Additionally, the computer system 600 may include an input device 612, such as a keyboard, and a cursor control device 614, such as a mouse. The computer system 600 can also include a disk drive unit 616, a signal generation device 618, such as a speaker or remote control, and a network interface device 620.

In a particular embodiment as depicted in FIG. 6, the disk drive unit 616 may include a computer-readable medium 622 in which one or more sets of instructions 624, e.g. software, can be embedded. Further, the instructions 624 may embody one or more of the methods or logic as described herein. In a particular embodiment, the instructions 624 may reside completely, or at least partially, within the main memory 604, the static memory 606, and/or within the processor 602 during execution by the computer system 600. The main memory 604 and the processor 602 also may include computer-readable media. The network interface device 620 can provide connectivity to a network 626, e.g., a wide area network (WAN), a local area network (LAN), or other network.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 624 or receives and executes instructions 624 responsive to a propagated signal, so that a device connected to a network 626 can communicate voice, video or data over the network 626. Further, the instructions 624 may be transmitted or received over the network 626 via the network interface device 620.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized Accordingly, the disclosure and the FIGs. are to be regarded as illustrative rather than restrictive.

The Abstract of the Disclosure is provided to comply with 37 C.F.R. §1.72(b) and is submitted with the understanding that it will not be used to interpret or limit the scope or meaning of the claims. In addition, in the foregoing Detailed Description of the Drawings, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description of the Drawings, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosed subject matter. Thus, to the maximum extent allowed by law, the scope of the present disclosed subject matter is to be determined by the broadest permissible interpretation of the following claims and their equivalents, and shall not be restricted or limited by the foregoing detailed description.

What is claimed is:

1. A system for routing voice communications, the system comprising:
    a memory that stores instructions;
    a processor that executes the instructions to perform operations, the operations comprising:
        receiving network event data from a switch associated with a peering communication network;
        determining a network weight for the peering communication network based on the network event data; and
        assigning, based on routing calls to the peering communication network associated with the switch in a proportion determined for the peering communication network, an order field value and a preference field value within a naming authority pointer record that includes a session initiation protocol address of the switch, wherein the proportion is based on the network weight, wherein the preference field value indicates a position in a sequence of a plurality naming authority pointer records in which the naming authority pointer record is applied to a selected call.

2. The system of claim 1, wherein the network weight reflects the proportion of the calls that are to be routed to the peering communication network.

3. The system of claim 1, wherein the operations further comprise reconfiguring the naming authority pointer record when the network weight is changed.

4. The system of claim 1, wherein the operations further comprise adjusting the network weight for the peering communication when additional network event data is received.

5. The system of claim 1, wherein the operations further comprise routing the calls to the peering communication network from an origination network.

6. The system of claim 1, wherein the operations further comprise receiving a request from a serving call session control function network element for the naming authority pointer record, wherein the request identifies a destination device communicating with the peering communication network based on a fully qualified domain name.

7. The system of claim 6, wherein the operations further comprise transmitting the naming authority pointer record to the serving call session control function network element based on the request.

8. The system of claim 1, wherein the peering communication network is a least congested peering communication network of a plurality of peering communication networks.

9. The system of claim 1, wherein the order field value and the preference field value within the naming authority pointer record is a lowest combination of order field and preference field values associated with the session initiation protocol address of the switch.

10. The system of claim 1, wherein the operations further comprise halting receipt of the network event data when a network event sampling period has terminated.

11. The system of claim 1, wherein the operations further comprise determining that the peering communication network is operating within a pre-defined parameter associated with a network health status.

12. A method for routing voice communications, the method comprising:
receiving network event data from a switch associated with a peering communication network;
determining, by utilizing instructions from memory that are executed by a processor, a network weight for the peering communication network based on the network event data; and
assigning, based on routing calls to the peering communication network associated with the switch in a proportion determined for the peering communication network, an order field value and a preference field value within a naming authority pointer record that includes a session initiation protocol address of the switch, wherein the proportion is based on the network weight, wherein the preference field value indicates a position in a sequence of a plurality naming authority pointer records in which the naming authority pointer record is applied to a selected call.

13. The method of claim 12, further comprising adjusting the network weight for the peering communication when additional network event data is received.

14. The method of claim 12, further comprising reconfiguring the naming authority pointer record when the network weight is altered.

15. The method of claim 12, further comprising halting receipt of the network event data when a network event sampling period has ended.

16. The method of claim 12, further comprising receiving a request the naming authority pointer record that identifies a destination device communicating with the peering communication network based on a fully qualified domain name.

17. The method of claim 16, further comprising transmitting the naming authority pointer record to a serving call session control function network element based on the request.

18. The method of claim 12, further comprising determining that the peering communication network is operating within a pre-defined parameter associated with a network health status.

19. A computer-readable device comprising instructions, which when loaded and executed by a processor, cause the processor to perform operations, the operations comprising:
receiving network event data from a switch associated with a peering communication network;
determining a network weight for the peering communication network based on the network event data; and
assigning, based on routing calls to the peering communication network associated with the switch in a proportion determined fro the peering communication network, an order field value and a preference field value within a naming authority pointer record that includes a session initiation protocol address of the switch, wherein the proportion is based on the network weight, wherein the preference field value indicates a position in a sequence of a plurality naming authority pointer records in which the naming authority pointer record is applied to a selected call.

20. The computer-readable device of claim 19, wherein the operations further comprise adjusting the network weight for the peering communication when additional network event data is received.

\* \* \* \* \*